United States Patent
Yukawa et al.

(10) Patent No.: US 8,337,984 B2
(45) Date of Patent: Dec. 25, 2012

(54) CARRIER FILM FOR FUEL CELL PRODUCTION PROCESS AND ITS PRODUCTION METHOD

(75) Inventors: Yasumasa Yukawa, Chiyoda-ku (JP); Tamao Okuya, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 319 days.

(21) Appl. No.: 12/539,647

(22) Filed: Aug. 12, 2009

(65) Prior Publication Data

US 2010/0040853 A1 Feb. 18, 2010

Related U.S. Application Data

(63) Continuation of application No. PCT/JP2008/052751, filed on Feb. 19, 2008.

(30) Foreign Application Priority Data

Feb. 19, 2007 (JP) ................. 2007-038339

(51) Int. Cl.
*B05D 3/12* (2006.01)
*B32B 7/04* (2006.01)

(52) U.S. Cl. ........ 428/337; 428/421; 428/910; 427/316; 427/322

(58) Field of Classification Search .................. None
See application file for complete search history.

(56) References Cited

U.S. PATENT DOCUMENTS

| 4,510,301 A * | 4/1985 | Levy ............................. 526/254 |
| 4,519,969 A * | 5/1985 | Murakami ................. 264/210.7 |
| 2002/0086963 A1 * | 7/2002 | Higuchi et al. ............... 526/255 |

FOREIGN PATENT DOCUMENTS

| EP | 0 104 546 A2 | 4/1984 |
| EP | 0 104 546 A3 | 4/1984 |
| EP | 1 213 318 A1 | 6/2002 |
| FR | 2 767 743 A1 | 3/1999 |
| JP | 60-056532 | 4/1985 |
| JP | 02-92518 | 4/1990 |
| JP | 2002-219750 | 8/2002 |
| JP | 2003-285396 | 10/2003 |
| JP | 2004-230673 | 8/2004 |
| WO | WO 02/39525 A1 | 5/2002 |

* cited by examiner

*Primary Examiner* — Ramsey Zacharia

(74) *Attorney, Agent, or Firm* — Oblon, Spivak, McClelland, Maier & Neustadt, L.L.P.

(57) ABSTRACT

To provide a carrier film for a fuel cell production process which is excellent in a recycling property and sufficient handling property in the fuel cell production process. A carrier film for a fuel cell production process, which is made of a fluororesin and has a tensile elastic modulus of at least 1,500 MPa in the machine direction, as measured in accordance with ASTM D882, and a tensile modulus of at least 100 MPa in the machine direction at 150° C., and which preferably has a thickness of from 10 to 300 μm.

17 Claims, No Drawings

CARRIER FILM FOR FUEL CELL PRODUCTION PROCESS AND ITS PRODUCTION METHOD

TECHNICAL FIELD

The present invention relates to a carrier film for a fuel cell production process and its production method.

BACKGROUND ART

The electric generation efficiency of fuel cells is high, and its environmental load is also low. Since solid polymer type fuel cells have a particularly high power density and a low operation temperature, miniaturization and cost reduction are easy, as compared to other fuel cells. Accordingly, the solid polymer type fuel cells are expected to be widely used for transporters such as automobiles, dispersion electric generation systems and cogeneration systems for houses.

In general, solid polymer type fuel cells are provided with a catalyst layer containing a metal catalyst and a sol)id polymer electrolyte resin (ion exchange resin) on both surfaces of the solid polymer electrolyte membranes respectively, and the outside of the catalyst layer is provided with a membrane/electrode assembly having a gas diffusion layer formed by using carbon paper or carbon cloth. Further, the outside of the gas diffusion layer is provided with an electrically conductive separator wherein a gas flow path is formed on its surface. The separator has a role to conduct current from the gas diffusion layer having a function to let fuel gas, oxidizing gas, etc. pass through and a function of a current collector to the outside portion of the solid polymer type fuel cell and a role to take out electric energy.

In a process for producing the fuel cells, a carrier film is used for forming or transporting a layer- or membrane-form member for fuel cells, such as a catalyst layer or a solid polymer electrolyte membrane. For example, a carrier film is coated with a solution containing a carbon carrying a metal catalyst and an ion exchange resin as the main solid component, followed by drying to form a catalyst layer, or a carrier film is coated with a solution containing an ion exchange resin as the main solid component, followed by drying to form a solid polymer electrolyte membrane.

The carrier film used for such applications is generally a polyethylene terephthalate (PET) film, a release agent-coated PET film or a fluororesin film.

However, among such films, the releasability of the PET film is poor. Further, in the case of the release agent-coated PET film, at a time of forming a component for fuel cells, the release agent transfers to deteriorate properties of the component for fuel cells. Further, although the fluororesin film has a good releasability, the fluororesin film is soft and handling property is poor. In order to solve such problems, it has been proposed to employ a laminated film wherein a fluororesin film and a film having a high rigidity are laminated (Patent Document 1).

Patent Document 1: JP-A-2003-285396

DISCLOSURE OF THE INVENTION

Problems to be Solved by the Invention

However, the above laminated film has a problem such that recycling of the fluororesin is difficult. In recent years, it is desired to reduce environmental load, and a carrier film which is excellent in the recycle property and made of only a fluororesin is desired, however, as mentioned above, the handling property of the conventional fluororesin films in the process for producing fuel cells is insufficient, and for example, at a time of forming a component for fuel cells, when thermal treatment is carried out for drying, etc., warps or wrinkles form. Such problems are likely to occur particularly in a case where a component for fuel cells is formed by roll-to-roll.

It is an object of the present invention to provide a carrier film for a fuel cell production process, which is excellent in a recycle property and has an excellent handling property in a process for producing fuel cells and its production method.

Means to be the Problems (1) A carrier film for a fuel cell production process, which is made of a fluororesin and has a tensile elastic modulus of at least 1,500 MPa in the machine direction, as measured in accordance with ASTM D882 and a tensile elastic modulus of at least 100 MPa in the machine direction at 150° C.

(2) The carrier film for a fuel cell production process according to the above (1), which is produced by monoaxial stretching of a fluororesin film in the machine direction or biaxial stretching of a fluororesin film in the machine direction and the transverse direction.

(3) The carrier film for a fuel cell production process according to the above (2), wherein after the monoaxial or biaxial stretching, the fluororesin film is further subjected to thermosetting treatment.

(4) The carrier film for fuel cell production processes according to the above (2) or (3), wherein the stretching temperature is at least the glass transition point and less than the melting point of the fluororesin constituting the fluororesin film.

(5) The carrier film for a fuel cell production process according to any one of the above (2) to (4), wherein the stretch ratio in the machine direction is from 2 to 8 times.

(6) The carrier film for a fuel cell production process according to any one of the above (1) to (5), which has a thickness of from 10 to 300 µm.

(7) The carrier film for a fuel cell production process according to any one of the above (1) to (6), wherein the fluororesin is an ethylene/tetrafluoroethylene copolymer.

(8) A method for producing a carrier film for a fuel cell production process which has a tensile elastic modulus of at least 1,500 MPa in the machine direction, as measured in accordance with ASTM D882 and a tensile elastic modulus of at least 100 MPa in the machine direction at 150° C., characterized by monoaxially stretching a fluororesin film in the machine direction or biaxially stretching a fluororesin film in the machine direction and the transverse direction.

(9) The method for producing a carrier film for fuel cell production process according to the above (8), wherein after the monoaxial or biaxial stretching, the fluororesin film is further subjected to thermosetting treatment.

(10) The method for producing a carrier film for a fuel cell production process according to above (8) or (9) wherein the stretching temperature is at least the glass transition point and less than the melting point of the fluororesin constituting the fluororesin film.

(11) The method for producing a carrier film for a fuel cell production process according to any one of the above (8) to (10), wherein the stretch ratio in the machine direction is from 2 to 8 times.

Effects of the Invention

The carrier film for a fuel cell production process of the present invention is substantially made of a fluororesin film and excellent in the recycling property. Further, the handling property in the fuel cell production process is also excellent such that wrinkles are not likely to form. Therefore, the productivity in the fuel cell production process can be improved.

BEST MODE FOR CARRYING OUT THE INVENTION

Now, the present invention will be explained in detail.

The fluororesin which constitutes the carrier film for a fuel cell production process of the present invention (hereinafter referred to as the carrier film of the present invention) is not particularly restricted, and tetrafluoroethylene type polymers having a tetrafluoroethylene as a monomer component, chlorotrifluoroethylene type polymers having a chlorotrifluoroethylene as a monomer component and vinylidene fluoride type polymers having a vinylidene fluoride as a monomer component may, for example, be mentioned.

The tetrafluoroethylene type polymer may, for example, be an ethylene/tetrafluoroethylene copolymer (ETFE), a tetrafluoroethylene/perfluoro(alkyl vinyl ether) copolymer (PFA), a tetrafluoroethylene/hexafluoropropylene copolymer (FEP) or a copolymer wherein other monomer component is further copolymerized with such a polymer. The carbon number of the perfluoroalkyl group in PFA is preferably from 1 to about 18.

The chlorotrifluoroethylene type polymer may, for example, be a polychlorotrifluoroethylene (PCTFE), an ethylene/chlorotrifluoroethylene copolymer (ECTFE) or a copolymer wherein other monomer component is further copolymerized with such a polymer.

One of these fluororesins may be used alone, or two or more such fluororesins may be blended to use.

The fluororesin which constitutes the carrier film of the present invention is preferably the ethylene/tetrafluoroethylene copolymer (ETFE). The molar ratio of copolymerization in the ethylene/tetrafluoroethylene copolymer (ethylene:tetrafluoroethylene) is preferably from 49:51 to 45:55.

The polyvinylidene fluoride (PVDF) which is a polymer of vinylidene fluoride monomers or polyvinyl fluoride (PVF) which is a polymer of vinyl fluoride monomers tends to have a low heat resistance (the strength under a high temperature is low).

The tensile elastic modulus in the machine direction (hereinafter referred to as MD) as measured in accordance with ASTM D882 (measured under a condition of 23° C. and 50% RH. Hereinafter referred to as MD tensile elastic modulus [ASTM D882]) of the carrier film of the present invention is at least 1,500 MPa, preferably at least 1,600 MPa, more preferably at least 2,000 MPa. If the MD tensile elastic modulus [ASTM D882] is less than 1,500 MPa, the handling property is poor. For example, when a member for fuel cells is formed on such a carrier film, followed by rolling the film, tension cannot be raised, and it is thereby difficult to finish rolling such a carrier film into a good roll shape. That is, at a time of practically rolling the film, rolling tension is gradually weakened from the inside of rolling to the outside, whereby a roll having a good shape without firm rolling or rolling miss can be obtained. Therefore, if rolling tension cannot be raised, and a rolling diameter is large for long rolling, sufficient tension for rolling the film at the outside of the rolling cannot be obtained, and roll length is restricted.

The higher the MD tensile elastic modulus [ASTM D882] is, the more the durability under a high temperature condition at the time of forming members for fuel cells improves. Therefore, the upper limit of the MD tensile elastic modulus [ASTM D882] is not particularly limited, and it is optionally limited depending on properties of a fluororesin film to be stretched, the range of stretching the fluororesin film or the like. From the viewpoint of the easy production, the MD tensile elastic modulus [ASTM D882] is preferably at most 8,000 MPa, more preferably at most 6,000 MPa.

Further, the MD tensile elastic modulus at 150° C. (hereinafter referred to as MD tensile elastic modulus [150° C.]) of the carrier film of the present invention is at least 100 MPa, preferably at least 120 MPa, more preferably at least 150 MPa. If the MD tensile elastic modulus [150° C.] is less than 100 MPa, the durability against heat at the time of forming members for fuel cells and tension at the time of rolling or transporting the carrier film or the like are insufficient, and the fluororesin film will thereby deform (tensile wrinkles of MD or elongation deformation).

The higher the MD tensile elastic modulus [150° C.] is, the durability under a high temperature condition at the time of forming members for fuel cells improves. Therefore, the upper limit of the MD tensile elastic modulus [150° C.] is not particularly limited, and it may optionally be decided depending on properties of the fluororesin film, the range of elongating the fluororesin film or the like. From the viewpoint of the easy production, the MD tensile elastic modulus [150° C.] is preferably at most 1,000 MPa, more preferably at most 700 MPa.

Here, the MD tensile elastic modulus at 150° C. can be measured by the same manner as in the method for measuring the MD tensile elastic modulus in accordance with ASTM D882, except that the measuring temperature (23° C.) limited in the ASTM D882 is changed to 150° C.

The carrier film of the present invention has the MD tensile elastic modulus [ASTM D882] of at least 1,500 MPa and the MD tensile elastic modulus [150° C.] of at least 100 MPa. Among them, the MD tensile elastic modulus [ASTM D882] is preferably at least 1,600 MPa, particularly preferably at least 2,000 MPa, and the MD tensile elastic modulus [150° C.] is preferably at least 120 MPa, particularly preferably at least 150 MPa.

The carrier film of the present invention may, for example, be produced by monoaxially stretching a fluororesin film in MD or biaxially stretching a fluororesin film in MD and the transverse direction (hereinafter referred to as TD).

Although a commercially available fluororesin film has the MD tensile elastic modulus [ASTM D882] of less than 1,500 MPa and the MD tensile elastic modulus [150° C.] of less than 100 MPa, it is possible to obtain a fluororesin film having the MD tensile elastic modulus [ASTM D882] of at least 1,500 MPa and the MD tensile elastic modulus [150° C.] of at least 100 MPa by stretching the commercially available fluororesin film in MD or in MD and TD.

The object can be accomplished by either monoaxially stretching a fluororesin film in only MD or biaxially stretching a fluororesin film in MD and TD.

The stretching may be carried out by conventional methods. In the case of the monoaxial stretching in only MD, roll stretching may be mentioned. In the case of biaxial stretching, simultaneous biaxial stretching or sequential biaxial stretching by a tenter method or a tube method may be mentioned.

The stretching temperature is usually at least the glass transition point and less than the melting point of a fluororesin which constitutes the fluororesin film, whereby deformation due to stretching can be preferably prevented. If the stretching temperature is lower than the glass transition point, since the resistance against deformation due to the stretching is high, it is difficult to stretch the fluororesin uniformly, and the film may break or tear at the time of stretching. If the stretching temperature is at least the melting point, since a film state of the fluororesin film cannot be maintained, the film cannot be stretched. Further, if the stretching temperature is at least the melting point, since the resin is in a melting state, molecules will not orient, and sufficient elastic modulus cannot be obtained.

For example, in a case where the fluororesin film is an ethylene/tetrafluoroethylene copolymer (ETFE) film, the stretching temperature is preferably from 90 to 200° C., more preferably from 100 to 160° C.

The stretching ratio in MD is preferably about from 2 to 8 times, more preferably from 2 to 6 times. If the stretching ratio is less than 2 times, it is difficult to obtain a fluororesin film having the desired tensile elastic modulus, and the required strength for forming members for fuel cells cannot be obtained. Depending on types of the fluororesin and conditions such as the film thickness after the stretching, the stretching ratio may exceed 8 times, and the higher the stretching ratio is, the more the mechanical strength improves, and the higher the tensile elastic modulus is. However, if the stretching ratio exceeds 8 times, since as the stretching ratio approaches to the upper limitation due to shear or breakage of the film, the range such as the stretching temperature or the rate of stretching becomes narrow, and it is difficult to stretch the resin stably.

The stretching ratio in TD by the biaxial stretching is preferably from 1 to 8 times, more preferably from 1 to 6 times.

In the present invention, the fluororesin film which is stretched by the above method (hereinafter sometimes referred to as stretched fluororesin film) is preferably subjected to further thermosetting treatment. The thermosetting-treated stretched fluororesin film has a small heat contraction, and it is preferably used for a fuel cell production process. If the heat contraction of the carrier film is large, when heat drying is carried out at the time of forming members for fuel cells, the carrier film deforms, and wrinkles or cracks (breakage) may result on the members for fuel cells formed on the carrier film.

The thermosetting treatment is usually carried out by such a manner that while maintaining the stretched fluororesin film under the stretching state, the film is left at a predetermined thermosetting temperature for the predetermined thermosetting time, followed by cooling to at a level of room temperature.

The thermosetting temperature is usually at least the stretching temperature and less than the melting point of the fluororesin which constitutes the fluororesin film. However, in a case where the difference between the melting point and the stretching temperature is small, the thermosetting treatment may be carried out at a temperature lower than the stretching temperature.

In the present invention, the thermosetting temperature is particularly preferably at least an operating temperature and less than the melting point. In such a case, the heat contraction at the time of forming members for fuel cells can suppressed.

Here, "operating temperature" is a heating temperature for drying a solution applied on the carrier film at the time of forming members for fuel cells. The operating temperature is usually from about 150° C. to 200° C.

For example, in a case where the fluororesin film is an ethylene/tetrafluoroethylene copolymer (ETFE) film, the thermosetting temperature is preferably from 180 to 250° C., more preferably from 200 to 230° C.

The thermosetting time is preferably from 5 to 600 seconds, more preferably from 10 to 300 seconds.

The thickness of the carrier film of the present invention is preferably from 10 to 300 μm, more preferably from 20 to 200 μm. When the thickness is at least 10 μm, the productivity of the carrier film is high, and the handling property further improves such that a transporting property of apparatus at the time of forming members for fuel cells improves. When the thickness is at most 300 μm, cost is reduced, size, weight, etc. at the time of rolling the film fall within the range such that the handling property is high.

The carrier film of the present invention can be used for forming layer or membrane members for fuel cells such as catalyst layers or solid polymer electrolyte membranes in a process for producing fuel cells; or for transporting the members for fuel cells or the like.

EXAMPLES

Now, the present invention will be described in detail with reference to Examples. However, the present invention is by no means restricted by such specific Examples.

Example 1

An ETFE film (tradename: Aflex 150N 600NT, manufactured by Asahi Glass Company, Limited) having a thickness of 150 μm and a width of 600 mm was stretched in the machine direction by a roll type monoaxial stretching machine at a stretching temperature of 140° C. with a stretching ratio of 3 times, followed by carrying out thermosetting treatment (while maintaining the stretching state, the film was heated to 200° C., and its heating state was maintained for 30 seconds, followed by cooling to room temperature (at most 30° C.)). Both edges of the film were cut at a time of rolling the obtained film to obtain a carrier film having a width of 500 mm. The carrier film had a thickness of 56 μm.

The MD tensile elastic modulus [ASTM D882] of the obtained carrier film was measured in accordance with ASTM D882 under a condition of 23° C. and 50% RH.

Further, the MD tensile elastic modulus [150° C.] was measured in the same manner as the above except that the temperature was changed to 150° C. Results are shown in Table 1.

Example 2

A carrier film was obtained in the same manner as in Example 1 except that an ETFE film (tradename: Aflex 200N 600NT, manufactured by Asahi Glass Company, Limited) having a thickness of 200 μm and a width of 600 mm was used, and the stretching ratio was changed to 5 times. The carrier film had a thickness of 55 μm.

The MD tensile elastic modulus [ASTM D882] and the MD tensile elastic modulus [150° C.] of the obtained carrier film were measured in the same manner as in Example 1. Results are shown in Table 1.

Example 3

A carrier film was obtained in the same manner as in Example 1 except that an ETFE film (tradename: Aflex 100N 600NT, manufactured by Asahi Glass Company, Limited) having a thickness of 100 μm and a width of 600 mm was used, and the stretching ratio was changed to 2 times. The carrier film had a thickness of 53 μm.

The MD tensile elastic modulus [ASTM D882] and the MD tensile elastic modulus [150° C.] of the obtained carrier film were measured in the same manner as in Example 1. Results are shown in Table 1.

Example Comparative 1

An ETFE film (tradename: Aflex 50N 500NT, manufactured by Asahi Glass Company, Limited) having a thickness of 50 μm and a width of 500 mm was prepared and used as a carrier film.

The MD tensile elastic modulus [ASTM D882] and the MD tensile elastic modulus [150° C.] of the carrier film were measured in the same manner as in Example 1. Results are shown in Table 1.

Example Comparative 2

A polyfluoride vinyl film (tradename: TEDLER TYPE 2, manufactured by Du Pont) having a thickness of 50 μm and width of 500 mm was prepared and used as a carrier film.

The MD tensile elastic modulus [ASTM D882] and the MD tensile elastic modulus [150° C.] of the carrier film were measured in the same manner as in Example 1. Results are shown in Table 1.

The following evaluations 1 was carried out on the carrier films obtained in Examples 1 to 3 and Comparative Examples 1 and 2.

Evaluation 1

Preparation of a Coating Solution for Forming Catalyst Layers

A copolymer (ion exchange capacity: 1.1 milli equivalent amount/gram dried resin) obtained by copolymerizing $CF_2=CF_2$ and $CF_2=CF-OCF_2CF(CF_3)-OCF_2CF_2SO_2F$, followed by hydrolysis to convert $-SO_2F$ to $-SO_3H$ and a carrier catalyst carrying 50 mass % of platinum on carbon at a mass ratio of 2:5 were dispersed in a mixed dispersion medium of ethanol and water (mass ratio: 1:1) to obtain a coating solution having a solid content concentration of 8 mass % for forming catalyst layers.

Formation of Catalyst Layers by Dry Coating

A carrier film having a width of 500 mm was coated with a coating solution for forming catalyst layers by using a continuous dry coating apparatus at a coating width of 480 mm by a dry coating method so that the film thickness after drying became 10 μm, followed by drying in a heated air drying oven at 150° C. for retention time of 1 min to form a catalyst layer. A 50 m length of a carrier film wherein the catalyst layer was formed on its surface was rolled by a paper cylinder having an outer diameter of 76 mm.

Evaluation Items

1) Wrinkle formation state at a time of drying: after drying and before rolling the film, the carrier film wherein the catalyst layer was formed on its surface was visually observed, and one having no wrinkle was judged as ⊚ (excellent), one having few wrinkles was judged as ○ (good), one wherein wrinkles were slightly observed (tolerance level) was judged as Δ (permissive), and one having wrinkles at a not tolerant level was judged as X (not good).

2) Roll state: a state of the rolled carrier film was visually observed, and one having substantially no wrinkle and irregularity was judged as ○ (good), one having a few wrinkles and irregularities, though tolerant level, was judged as Δ (permissive), and one having wrinkles and irregularities which were not tolerant level was judged as X (not good).

3) Cutting state: 1 m length of a carrier film was cut out from the rolled carrier film, the carrier film was spread on a plane stand and visually observed, and one having few wrinkles and distortion (ruffles) state was judged as ○ (good), one having few wrinkles and distortions which were tolerant level though was judged as Δ (permissive), and one having not tolerant wrinkles and distortions which were not tolerant level was judged as X (not good).

Results are shown in Table 1.

TABLE 1

| | Ex. 1 | Ex. 2 | Ex. 3 | Comp. Ex. 1 | Comp. Ex. 2 |
|---|---|---|---|---|---|
| Thickness (μm) | 56 | 55 | 53 | 50 | 50 |
| MD tensile elastic modulus [ASTM D882] (MPa) | 2520 | 3680 | 1670 | 780 | 1800 |
| MD tensile elastic modulus [150° C.] (MPa) | 170 | 320 | 128 | 54 | 60 |
| Wrinkle formation state at a time of drying | ○ | ⊚ | Δ | X | X |
| Roll state | ○ | ○ | ○ | Δ | Δ |
| Cutting out state | ○ | ○ | ○ | X | X |

As shown in the results in Table 1, the carrier films of Examples 1 to 3 having at least 1,500 MPa of the MD tensile elastic modulus [ASTM D882] and at least 100 MPa of the MD tensile elastic modulus [150° C.] had few wrinkles and ruffles due to heat at the time of drying, and they were flat even after the catalyst layer formation.

On the other hand, in the case of the carrier film of Comparative Example 1 having a low MD tensile elastic modulus [ASTM D882] and a low MD tensile elastic modulus [150° C.] and the carrier film of Comparative Example 2 having at least 1,500 MPa of the MD tensile elastic modulus [ASTM D882] but less than 100 MPa of the MD tensile elastic modulus [150° C.], wrinkles or ruffles were formed by the influence of the distortion due to heat at the time of drying, and an excellent catalyst layer could not be formed.

INDUSTRIAL APPLICABILITY

The carrier film for a fuel cell production process of the present invention is substantially made of a fluororesin film and excellent in the recycle property. Further, the carrier film of the present invention is excellent in the handling property in the fuel cell production process such that wrinkles are not likely to form. Therefore, the productivity in the fuel cell production process can be improved.

The entire disclosure of Japanese Patent Application No. 2007-038339 filed on Feb. 19, 2007 including specification, claims and summary is incorporated herein by reference in its entirety.

What is claimed is:

1. A coated carrier film for a fuel cell production process, comprising:
    a coating of a layer of a fuel cell or a membrane component of a fuel cell; and
    a carrier film consisting of a biaxially stretched fluororesin; wherein
    a tensile elastic modulus of the carrier film is at least 1,500 Mpa in the machine direction, as measured in accordance with ASTM D882,
    a tensile elastic modulus of the carrier film is at least 100 MPa in the machine direction at 150° C., and
    the coating is releasable from the carrier film.

2. The coated carrier film for a fuel cell production process according to claim 1, wherein
    the fluororesin carrier film is biaxially stretched in the machine direction and the transverse direction.

3. The coated carrier film for a fuel cell production process according to claim 2, wherein after the biaxial stretching, the fluororesin carrier film is further subjected to a thermosetting treatment.

4. The coated carrier film for a fuel cell production process according to claim 2, wherein a stretching temperature is at least the glass transition point and less than the melting point of the fluororesin of the fluororesin carrier film.

5. The coated carrier film for a fuel cell production process according to claim 2, wherein a stretch ratio in the machine direction is from 2 to 8 times.

6. The coated carrier film for a fuel cell production process according to claim 1, wherein a thickness of the fluororesin carrier film is from 10 to 300 μm.

7. The coated carrier film for a fuel cell production process according to claim 1, wherein the fluororesin is an ethylene/tetrafluoroethylene copolymer.

8. A method for producing a coated carrier film for a fuel cell production process, comprising:
   biaxially stretching a fluororesin film in the machine direction and the transverse direction to obtain a fluororesin carrier film, having a tensile elastic modulus of at least 1,500 Mpa in the machine direction, as measured in accordance with ASTM D882 and a tensile elastic modulus of at least 100 MPa in the machine direction at 150° C.; and
   coating the obtained fluororesin carrier film with a layer of a fuel cell or a membrane member of a fuel cell.

9. The method for producing a coated carrier film for a fuel cell production-process according to claim 8, further comprising after the or biaxial stretching, a thermal setting treatment of the fluororesin film.

10. The method for producing a coated carrier film for a fuel cell production-process according to claim 8, wherein a stretching temperature is at least the glass transition point and less than the melting point of the fluororesin of the fluororesin carrier film.

11. The method for producing a coated carrier film for a fuel cell production-process according to claim 8, wherein a stretch ratio in the machine direction is from 2 to 8 times and a stretch ratio in the transverse direction is 1 to 8 times.

12. A coated carrier film for production of a fuel cell, comprising:
   an ion exchange resin coating; and
   a carrier film consisting of a biaxially stretched fluororesin; wherein
   a tensile elastic modulus of the carrier film is at least 1,500 Mpa in the machine direction, as measured in accordance with ASTM D882,
   a tensile elastic modulus of the carrier film is at least 100 MPa in the machine direction at 150° C., and
   the ion exchange resin coating is releasable from the carrier film.

13. The coated carrier film for production of a fuel cell according to claim 12, wherein after the biaxial stretching, the fluororesin carrier film is further subjected to a thermosetting treatment.

14. The coated carrier film for production of a fuel cell according to claim 12, wherein a stretching temperature is at least the glass transition point and less than the melting point of the fluororesin of the fluororesin carrier film.

15. The coated carrier film for production of a fuel cell, according to claim 12, wherein a stretch ratio in the machine direction is from 2 to 8 times and a stretch ratio in the transverse direction is 1 to 8 times.

16. The coated carrier film for production of a fuel cell, according to claim 12, wherein a thickness of the fluororesin carrier film is from 10 to 300 μm.

17. The coated carrier film for production of a fuel cell, according to claim 12, wherein the fluororesin is an ethylene/tetrafluoroethylene copolymer.

\* \* \* \* \*